United States Patent [19]

Smith

[11] Patent Number: 4,497,059
[45] Date of Patent: Jan. 29, 1985

[54] MULTI-CHANNEL REDUNDANT PROCESSING SYSTEMS

[75] Inventor: T. Basil Smith, Sudbury, Mass.

[73] Assignee: The Charles Stark Draper Laboratory, Inc., Cambridge, Mass.

[21] Appl. No.: 372,734

[22] Filed: Apr. 28, 1982

[51] Int. Cl.³ ............................................. G06F 11/18
[52] U.S. Cl. ........................................ 371/36; 371/68
[58] Field of Search .................... 371/36, 68; 307/219, 307/269

[56] References Cited

U.S. PATENT DOCUMENTS

| | | | |
|---|---|---|---|
| 3,501,743 | 3/1970 | Dryden | 371/36 |
| 3,783,250 | 1/1974 | Fletcher et al. | 371/68 |
| 3,805,235 | 4/1974 | Foster et al. | 371/68 |
| 3,829,668 | 8/1974 | Noumi et al. | 371/68 |
| 4,270,715 | 6/1981 | Norton et al. | 371/36 |
| 4,356,546 | 10/1982 | Whiteside et al. | 371/36 |
| 4,402,045 | 8/1983 | Krol | 371/68 |

*Primary Examiner*—Jerry Smith
*Assistant Examiner*—Mark Ungerman
*Attorney, Agent, or Firm*—Robert F. O'Connell

[57] ABSTRACT

A system having a plurality of redundant channels operating in tight synchronism wherein input information received in one or more of said channels is distributed to all the other channels. The received information in each channel is retransmitted to suitable voter circuitry in each channel so as to provide one or more voted outputs in each channel based on the distributed and retransmitted information from all the channels. The voted outputs from all unfailed channels are substantially identical and the voted output from a failed channel will not be identical to that of the unfailed channels.

14 Claims, 5 Drawing Figures

MULTI-CHANNEL REDUNDANT PROCESSING SYSTEMS

INTRODUCTION

This invention relates generally to redundant, or fault-tolerant, real-time digital control systems and, more particularly, to such systems which use unique time synchronous data transfer techniques.

BACKGROUND OF THE INVENTION

Digital control systems are often used in a manner similar to analog control systems, in which applications they emulate the continuous loop operations of analog systems by utilizing rapidly sampling sensors and then recomputing the desired output commands and changing the outputs to new positions. If such operation can be performed sufficiently rapidly relative to the dynamics of the system which is being controlled, the overall control operation appears to be of a continuous nature. However, redundant systems can easily develop relatively excessive time delays, much in the way that non-redundant digital control systems develop such delays in pipe-line structures. Thus, an overall transport delay occurs in a redundant system due to the latency from the moment the value becomes available for transmission at one end of the overall redundant link to the point at which that value becomes available to the computation process at the receiving end of the link. Accordingly, redundant systems tend to be handicapped by these time delays and other problems associated with interchannel communication.

Previous redundant, real-time digital control systems have utilized asynchronous operation among the redundant channels. Such asynchronous digital control provides advantages over analog systems because of the increased stability of the digital system and the reliability of the digital value equivalents which are utilized. Further such systems provide the increased flexibility which "software" encoding of algorithms produces over hard-wired analog systems. Asynchronous systems, however, have serious fault diagnosis and equalization problems and the updating, or sampling, rates which are used are forced to be extremely high, thereby substantially burdening the interchannel communications and channel computation operations. Further, when the output of one digital element is fed to the input of another, no effort is made to synchronize the update rates of the digital computation frames and the worst case data arrival conditions can occur. That is, the output of one system arrives so that it is just missed by the input sampling of the next stage, for example. Moreover, the sampling rates of the asynchronous components can tend to beat against one another resulting in a variation in transport delays which action develops a "jitter" resembling noise which has a specified frequency component. Attempts to solve such problems by increasing the already high sampling rates may produce rates which are much greater than necessary in a unified system without asynchronous operation. A totally asynchronous system tends to require increased costs of design and manufacture and less flexibility in its operation. Further such systems give rise to threshold problems, error detection problems and cross-channel equalization problems which are relatively complex and unwieldy to handle.

Solutions to such problems have been suggested by utilizing redundant, real-time control systems which operate in a "frame synchronous" manner. That is, redundant elements execute exactly the same time frame computations with each of the separate time frame computations being fed by identical inputs. Such operation requires that the interaction between frames be relatively tightly controlled so that they begin and end at the same time in each of the redundant channels. Inter-channel communications and interaction can then be bounded in their behaviors. An advantage of frame synchronization is that, if each redundant version can be made to operate on identical inputs, then, because of the nature of digital computation, the outputs generated under such circumstances will be identical. Any disagreement among the channels is an indication of a fault. Since the channels cannot diverge without a fault, cross-channel equalization problems are eliminated and thresholding problems can be more easily handled. Further the problems of transport delay and jitter are greatly reduced by using frame synchronization.

However, in frame synchronous operations the transfer of data items into and out of data transfer queues among the various channels must be carefully planned and synchronized with the frame, or subframe, rates and with the underlying control computations. Data must be appropriately tagged as to its meaning before transmission so as to insure proper unscrambling of such data at the receiving end. It is typical for the exchange links in frame synchronous systems to become bottlenecked and saturated, thereby requiring continual redesign until the end of the overall design and development process. As a result, the finally designed system may be somewhat awkward to program and may require strange solutions to generic redundancy problems.

A more "tightly synchronous" system can be used to improve upon either asynchronous or frame synchronous redundant systems. In such systems, all the channels operate in accordance with the same time base, either by using a single clock for supplying such identical time base to each of the channels or by utilizing a form of fault-tolerant clock system so that once system synchronization is achieved it is automatically maintained. Such tight synchronism can be utilized to provide dedicated near-zero latency data exchanges between the channels so that custom hardware can be designed to perform such exchanges with maximum efficiency. Because of the tight time synchronization which is used, the problem of programming the system is reduced to the logical equivalent of programming a single channel, while at the same time providing the necessary channel redundancy and separations. Because each of the channels execute the same program, the overall software design complexity is considerably reduced over that needed in either frame synchronous or asynchronous systems. Each channel is forced to execute identical instructions at exactly the same time. It is not necessary to tag the data as to its content since every channel is implicitly aware of the data content. Accordingly, only the data bits themselves need be transmitted with no additional data bits required for identification thereof. Further, no complex message protocol is required since each channel knows exactly when a data word is expected and where to put it. Since each channel operates simultaneously with each of the other channels, no channels need wait for another channel to catch up or fear that it has fallen behind any of the other channels. Hence, there is no waste in time for synchronization with respect to each data exchange.

In a frame synchronous system, it is not unlikely that each channel would have to execute a large number of instructions for every data value which is exchanged between the channels. In contrast, in a tightly synchronous system, the equivalent number of instructions required is reduced dramatically by as high as an order of magnitude.

Tightly synchronized systems suggested in the prior art are of the master/slave configuration, where only a single one of the multiple channels operates as a master processor and all other channels operate as slave processors. In such systems, communications occurred only from the master to the slave channels and the input/output (I/0) devices related to each channel must always be identified. The flexibility of such systems is limited because two-way communication among all channels is not possible.

BRIEF SUMMARY OF THE INVENTION

In accordance with the invention, a redundant, real-time digital control system utilizes a tightly synchronous operation wherein all channels operate equally (i.e., there is no master/slave relationship among them) and all channels are capable of receiving information, representing, for example, data from separate sources, such as sensors or other detectors, interrupt requests information, synchronization information, etc. Such information can then be mutually exchanged or distributed among all of the channels so that each channel receives information from all the other channels. Such information can then be transmitted to suitable voter circuitry in each channel so as to provide a voted output based on distributed information from all the channels. In accordance with such procedure, the voted outputs from all unfailed channels will be identical and the voted output from a failed channel (i.e., one which has a fault at some point therein) will not be identical to that of the unfailed channels. Hence, the redundant system as a whole is assured that all identical voted outputs represent information which is the desired correct information and is further assured that failed channels can be identified as those whose voted outputs are not in agreement with the identical voted outputs from unfailed channels.

DESCRIPTION OF THE INVENTION

The invention can be described in more detail with the help of the accompanying drawings wherein.

Figure 1:
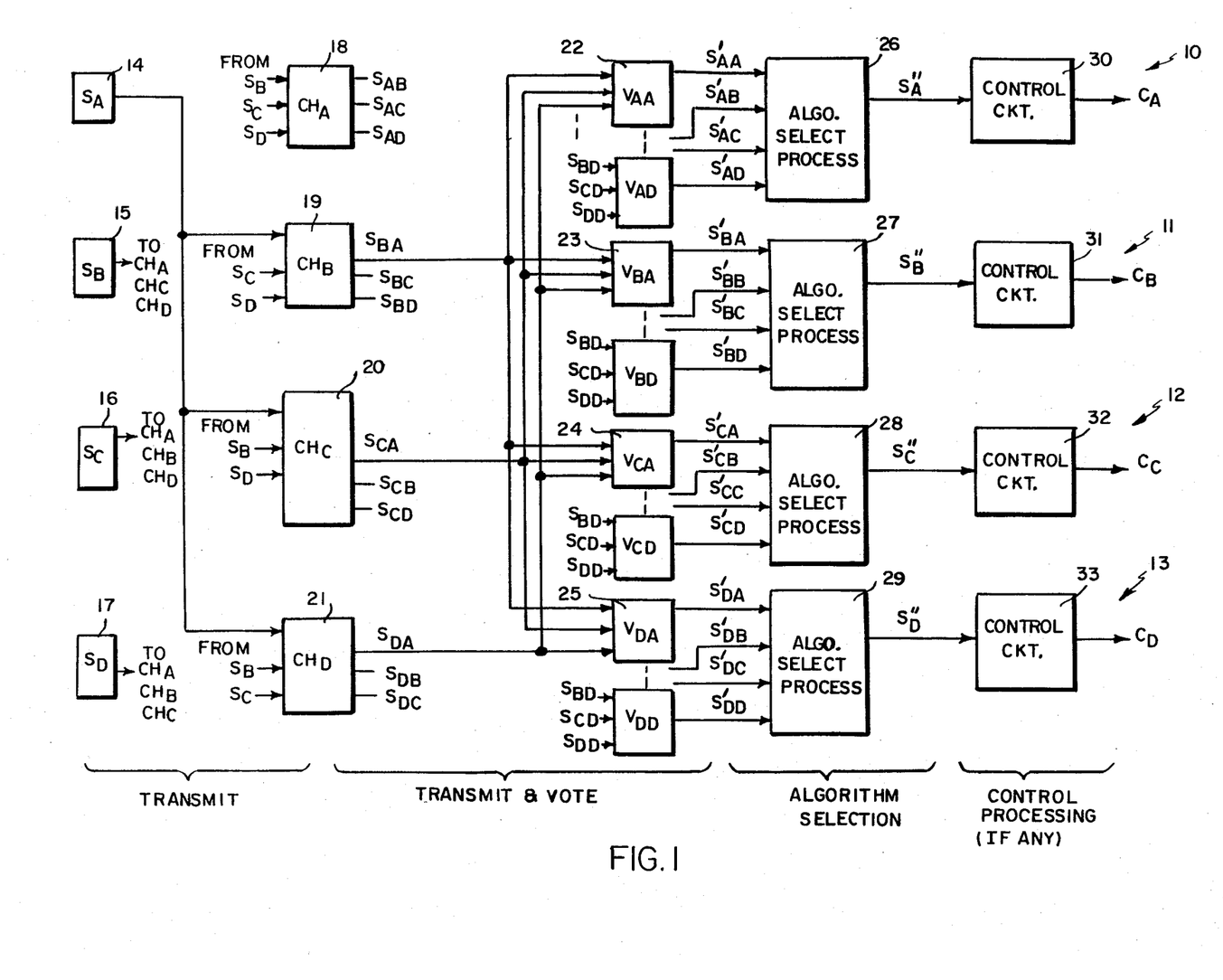
FIG. 1 depicts a block diagram of one embodiment of a redundant system in accordance with the invention.

FIG. 1 depicts in broad block diagram form an exemplary redundant system in accordance with the invention, such system comprising four channels 10, 11, 12 and 13, each of which has an associated signal input device 14, 15, 16 and 17, respectively. Such device, for example, may be an appropriate sensor or detector means which provides an output signal representing a sensed parameter. Such sensors are designated in FIG. 1 as $S_A$, $S_B$, $S_C$ and $S_D$. Suitable timing means (not shown) are provided to maintain the operation of the channels in tight synchronism. Such timing can be achieved, for example, by using the same basic clock signal so that all channels operate in exact synchronism. Identical timing can be achieved either by using a single non-failing clock source for simultaneously supplying the same clock signal to all channels or by using a form of fault-tolerant clock system such as described in U.S. Pat. No. 4,239,982 issued on Dec. 16, 1980 to T. B. Smith et al. In either case, all channels receive the same clock pulses at the same rate.

In a particular embodiment, for example, each of the sensors is arranged to sense the same parameter so as to produce the same output signal. Because of slight differences in the structure and operation of the different sensors, the sensed output signals therefrom may vary slightly from each other. In order to provide an appropriate control signal from each channel for use in whatever application the redundant system is to be employed (shown as control signals $C_A$, $C_B$, $C_C$, and $C_D$), suitable processing of the sensed signals in accordance with the exemplary embodiment of the invention depicted in FIG. 1 is described in more detail below.

Thus the output $S_A$ of sensor 14 is supplied to each of the other channels. For simplicity each of the channel processors is designated by blocks 18, 19, 20 and 21, identified as $CH_A$, $CH_B$, $CH_C$ and $CH_D$, respectively. The output signal from sensor $S_A$ is received at channel processor $CH_B$ and, in turn, supplies such signal as a channel output signal identified as $S_{BA}$. Correspondingly the signal output from sensor $S_A$ is received at channel processors $CH_C$ and $CH_D$ and, in turn, provides signal outputs identified as $S_{CA}$ and $S_{DA}$, respectively. The signals $S_{BA}$, $S_{CA}$ and $S_{DA}$ are supplied to voter circuits 22, 23, 24 and 25 in channels 10, 11, 12 and 13, respectively, identified in FIG. 1 as $V_{AA}$, $V_{BA}$, $V_{CA}$ and $V_{DA}$, respectively. A voted output signal from each of such voter circuits is then obtained as shown by the corresponding output signals $S'_{AA}$, $S'_{BA}$, $S'_{CA}$ and $S'_{DA}$ in each of the channels.

The same sensor signal distribution process occurs with reference to the outputs of each of the other sensors. Thus, the output $S_B$ from sensor 15 is supplied to channel processors $CH_A$, $CH_C$ and $CH_D$ and the transmitted values therefrom (e.g., $S_{AB}$, $S_{CB}$ and $S_{DB}$) are then supplied to appropriate voter circuits $V_{AB}$, $V_{BB}$, $V_{CB}$ and $V_{DB}$ (not specifically shown in FIG. 1) in each of the channels in the same manner that the received signals from sensor $S_A$ were described as distributed and supplied to voter circuits 22, 23, 24 and 25. In a similar manner, the output from sensor $S_C$ is supplied to channel processors $CH_A$, $CH_B$ and $CH_D$ and the output $S_D$ is supplied to channel processors $CH_A$, $CH_B$ and $CH_C$, the transmitted values thereof being supplied to corresponding voter circuits in each of the channels to produce the voted values thereof ($S'_{AC}$, $S'_{BC}$, $S'_{CC}$, $S'_{DC}$ and $S'_{AD}$, $S'_{BD}$, $S'_{CD}$ and $S'_{DD}$, respectively). A suitable algorithm can then be utilized to select from the voted output values in each channel a desired output voted value as identified by algorithm select process blocks 26, 27, 28 and 29. The algorithm selection process then supplies the selected voted values $S''_A$, $S''_B$, $S''_C$ and $S''_D$.

Such voted values can then be supplied to suitable control circuits 30, 31, 32 and 33, respectively, as used in whatever application the sensed value is to be utilized in order to supply output control signals identified as $C_A$, $C_B$, $C_C$ and $C_D$, respectively. At the end of such signal distribution process the system is assured that, even if one of the channels fails, the control signals obtained in each of the unfailed channels will be identical. Because of such fact, so long as any two control signals are the same, such control signal can be utilized as the correct control output since such identity indicates that the channels from which such control signals have been derived have no faults (i.e., such channels have not failed). Further, the system is assured that any control signal which does not agree with such identically valued control signals can be deemed to have arisen from a channel that has failed.

While the channels have only been shown in relatively broad block diagram form in FIG. 1, the circuitry and components required for performing the functions of the blocks therein would be clear to those in the art. Such channels, for example, can utilize conventional data processors (computers) by which the various input signals involved can be appropriately received, stored and transmitted in the distributive manner shown. Thus, suitable registers can be utilized within each data processor or computer system for temporarily storing the received and retransmitted signals. Signals which require more permanent storage can be stored in an appropriate long term memory. Suitable voter circuitry can be utilized for performing the desired voting step in the overall processing. For example, a voter circuit which selects the desired output signal from a majority vote of the input signals can be used and such voting circuits are well known to the art. The algorithm selection process will be devised for whatever application the particular data will be used. For example, one suitable algorithm selection may involve a selection of the mid-value of the plurality of distributed input signals supplied thereto. Such a selection process is described, for example, in copending U.S. patent application Ser. No. 272,670, filed on June 11, 1981 by J. McKenna.

The control circuits in FIG. 1 will clearly depend upon the application to which the system is put. Such control circuits may accept the sensed values ($S''_A$, $S''_B$, $S''_C$, $S''_D$) as selected by the algorithm selection process and, by utilizing other input parameter signals, for example, produce a suitable control signal for performing a particular function. For example, the control signal may be a command for moving a surface associated with an aircraft, the sensed value representing one parameter (e.d., speed, acceleration, surface position, etc.) which, when coupled with other parameters, will provide a suitable output command. The particular algorithm selection and control circuitry utilized do not form an indigenous part of the invention, inasmuch as any appropriate algorithm selection and control in which the identical voted output signals are to be utilized can be used by the art.

The key to the ability of the redundant system of the invention, as shown in the exemplary embodiment of FIG. 1, to efficiently provide an identical signal for each unfailed channel and to quickly identify which channels have failed lies in the signal distribution technique disclosed, i.e., in the transmission of each of the input signals (in this case the sensor signals) from a particular channel to each of the other channels and the re-transmission of the received values to voting circuits in all of the channels so as to provide voted values, identical ones of which represent the desired correct sensed value and non-identical ones of which identify failed channels. The desired correct values can then be appropriately used or operated upon (as by an algorithm select process and control circuitry) to provide operating control signals for any particular application as desired by a user.

The technique of the invention can be utilized for any application in which an input signal is being supplied to one or more of a plurality of redundant channels and wherein it is desired to provide an appropriate output signal in response thereto even when one or more of the channels have failed. In another application, for example, such a redundant system can be utilized in dealing with system interrupt signals as shown, for example, in FIG. 2. Thus an interrupt signal from an external input/output (I/0) device may be supplied to one of a plurality of redundant channels, e.g., an interrupt signal $I_A$ to channel A. Such interrupt signal can include, for example, an interrupt request bit as well as additional information identifying the particular external device which is requesting the interrupt, the type of operation which is being requested, etc. Accordingly, such an interrupt signal is supplied to appropriate interrupt handling circuitry (in hardware or software form) as in any conventional interrupt operation used in known data processing systems. The interrupt handler then supplies an interrupt signal $I'_A$ which, for example, may comprise a single bit, one state of which indicates the presence of the interrupt. The interrupt signal $I'_A$ is then distributed to all of the remaining channels (channels B, C and D) in the same manner as a sensor signal described with reference to FIG. 1. The interrupt signal $I'_A$ received by channels $CH_B$, $CH_C$ and $CH_D$ from the interrupt handler of channel A is then re-transmitted for distribution to voting circuits in all of the channels, such further distribution being indicated by the signals $I'_{BA}$, $I'_{CA}$, and $I'_{DA}$. Voter circuits $V_{AA}$, $V_{BA}$, $V_{CA}$ and $V_{DA}$ then utilize appropriate voting techniques for producing at their outputs the voted interrupt signals $I''_{AA}$, $I''_{BA}$, $I''_{CA}$ and $I''_{DA}$. If no single channel failure has occurred, all of the voted upon interrupt signals should be identical. Any channel which has failed will produce a signal which is not identical with those of the remaining channels and, therefore, the failed channel can be appropriately identified in the same manner as discussed above with reference to FIG. 1.

Figure 2:
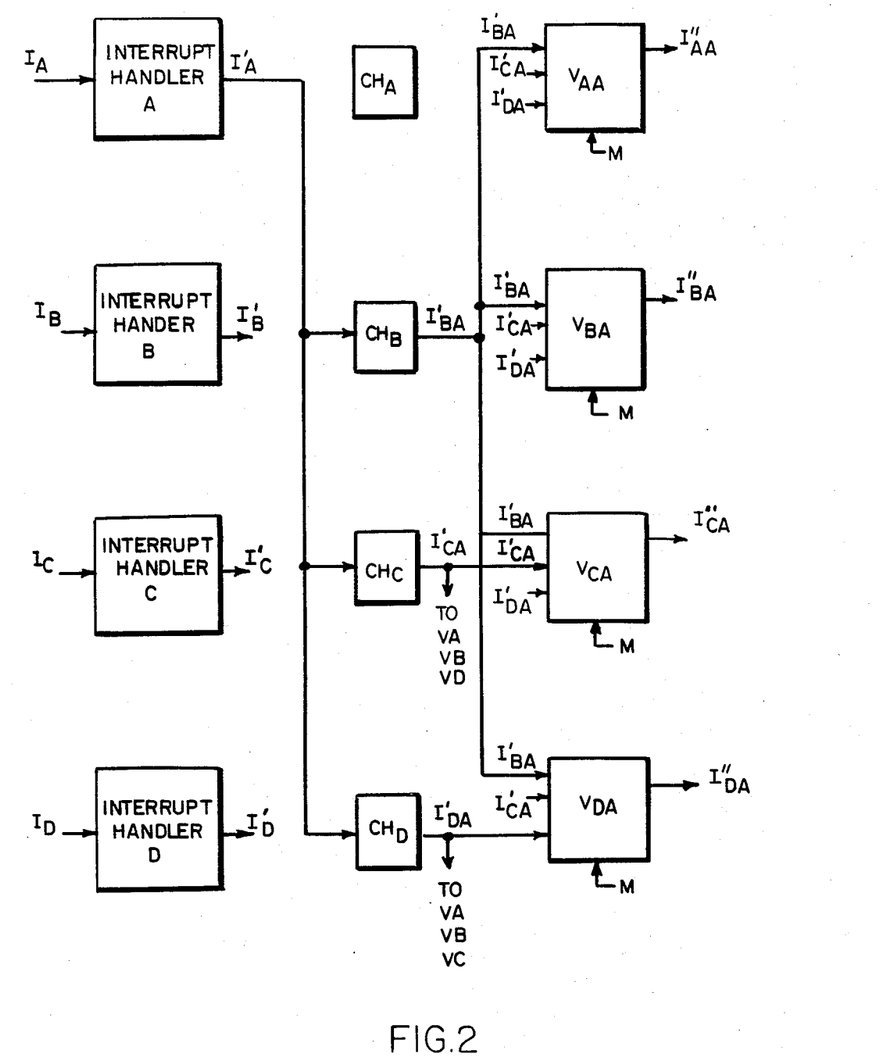
FIG. 2 depicts a block diagram of an alternative embodiment of the invention.

Although the operation shown in FIG. 2 deals with the generation of an interrupt request by an external device associated with channel A, the same procedure can be used for interrupts from devices associated with each of the other channels, even where such latter interrupts are received substantially simultaneously from one or more of the other channels. For example, an interrupt request from a device associated with channel B can be processed by interrupt handler for such channel and the interrupt output signal $I'_B$ resulting therefrom can be distributed to channels A, C and D. The interrupt so received by such channels is then re-transmitted as interrupt signals $I'_{AB}$, $I'_{CB}$ and $I'_{DB}$ (not shown) to appropriate voter circuits in each of the channels (also not shown) to produce the channel B voted outputs $I''_{AB}$, $I''_{BB}$, $I''_{CB}$ and $I''_{DB}$ (also not shown) in a manner similar to the production of $I''_{AA}$, $I''_{BA}$, $I''_{CA}$ and $I''_{DA}$. Such outputs, as with those obtained as a result of the processing of the interrupt request in Channel A, will also be identical in all unfailed channels and where such an output does not agree with such identical outputs, the channel associated therewith can be identified as one having a fault of some nature. The simultaneous interrupts from more than one channel, as provided at the output of the voter circuits in FIG. 2, can then be suitably handled by the associated channel in accordance with well known interrupt routines or priority logic. As in the system of FIG. 1, the system of FIG. 2 utilizes a basic clock signal supplied to all channels to assure operation in tight synchronization.

Should a channel fail in such a way that an apparent interrupt continues to be asserted therein, even when no external device associated with such channel has requested an interrupt operation, it is desirable that the other channels of the redundant system of FIG. 2 ignore such repeated (and incorrect) interrupt requests. For such purpose, suitable "masking" logic can be used to generate a masking signal M which is interpretable by the voter circuits as a signal for masking out from the voting process any input associated with the channel in question. Masking logic for such purpose would be readily known to the art since interrupt masking signals have long been used in other contexts.

In a still further exemplary embodiment of the invention, the signal distribution approach of FIGS. 1 and 2 can also be used to provide for a correct start-up procedure when using redundant channel operation. During "turn-on" of the system all of the channels will not necessarily be ready for operation at the same time because of different time delays which occur due to power supply differences, component differences, etc., during the start-up operations. Accordingly, the systems will not operate in the tightly synchronized manner that is desired. The technique of the invention can provide suitable procedures for assuring that all the channels begin the execution of operating instructions at the same point in time and by using the same basic clock signal (as described above with reference to FIG. 1), they will then operate in exact synchronism. While the use of the same basic clock signal can assure that all channels are performing their operations at the same clock rate (i.e., in tight synchronization), a procedure must be devised to assure that the same operation is occurring in each channel during the same clock cycle, a condition which can occur only if the channels begin execution of the same instructions at the same time.

A process similar to the sensor data exchange and interrupt signal exchange techniques, described with reference to FIGS. 1 and 2, can be utilized to assure that all channels come into synchronization at a selected point in time, as discussed with reference to the block diagram of FIG. 3 and the timing diagram shown in FIG. 4.

Figure 3:
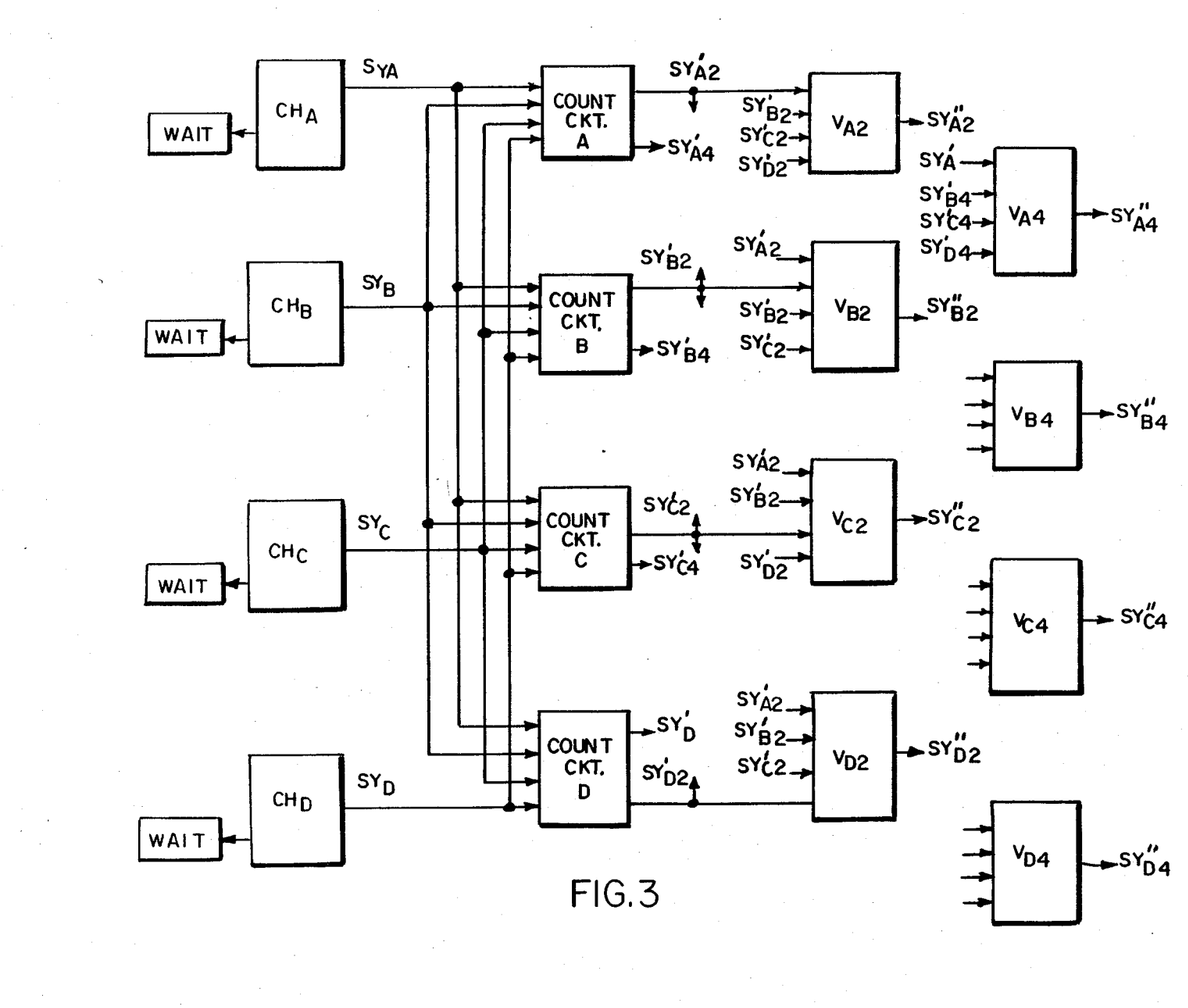
FIG. 3 depicts a block diagram of another alternative embodiment of the invention.

As seen therein, each channel processor of a four channel redundant system, identified in FIG. 3 as channels $CH_A$, $CH_B$, $CH_C$ and $CH_D$, can be turned on substantially simultaneously in accordance with normal start-up procedures. As in standard processor operation each claimed processor performs its normal start-up or initialization operations, i.e., the clearing of registers, the re-setting of signals, the performance of automatic start-up diagnostic subroutines for testing certain portions of the hardware, etc., which are required before the processor can begin any execution of operating instructions. Once such conventional start-up procedures are completed, each processor can begin an initial synchronization instruction which results in the generation of a synchronization signal (SY) which indicates the processor is ready for the execution of operational instructions. Such synchronization signal is identified in each channel in FIG. 3 as the signals $SY_A$, $SY_B$, $SY_C$ and $SY_D$, respectively.

Figure 4:
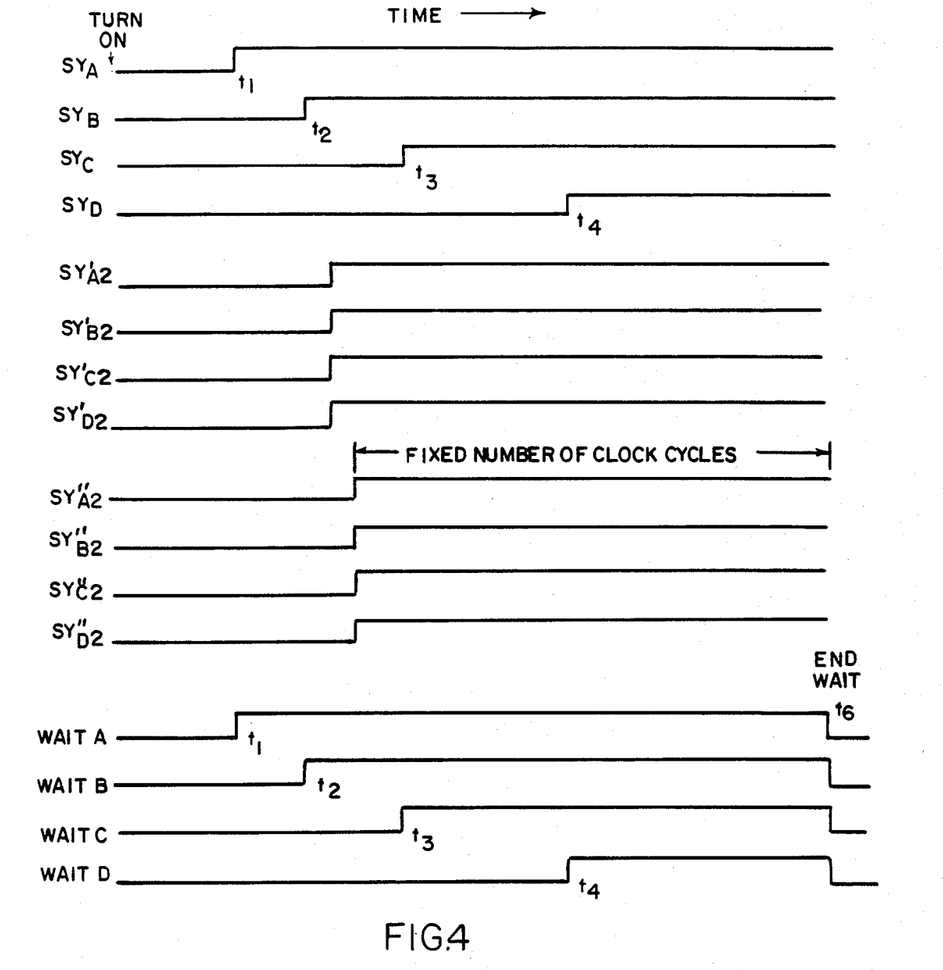
FIGS. 4 and 4A depict timing diagrams which are helpful in explaining the operation of embodiments related to FIG. 3.

As seen in FIG. 4, each processor normally will require a different time for reaching its synchronization stage so that such signals are asserted at different times $t_1$, $t_2$, $t_3$ and $t_4$. Although, for convenience in explaining the operations involved, the order in which such times occur is as shown in FIG. 4, it is clear that the four channels can reach such states in any order. It is desirable then that all the channels begin the execution of operating instructions at the same time. The system is arranged so that none of the channels can begin such operation prior to the other channels unless, due to a channel failure, one or more of the channels fails to reach the synchronization stage after a reasonable time. In the latter case, the channels which have reached such stage are permitted to begin their operations simultaneously in synchronization. Such procedure is explained in more detail below.

When a synchronization signal, e.g., $SY_A$, is generated, it is transmitted from the generating channel, e.g., channel A, to counting circuits in each of the other channels, as shown in FIG. 3. The latter circuits keep track of how many channels have generated an SY signal and when (for the four channel system discussed herein) at least two synchronization signals have been generated in two channels (e.g., $SY_A$ and $SY_B$), the counting circuits produce the signals $SY'_{A2}$, $SY'_{B2}$, $SY'_{C2}$ and $SY'_{D2}$. Such signals are then supplied to voter circuits ($V_{A2}$, $V_{B2}$, $V_{C2}$ and $V_{D2}$) in each of the channels. The voter circuit outputs $SY''_{A2}$, $SY''_{B2}$, $SY''_{C2}$ and $SY''_{D2}$ then represent the voted representations of the synchronization of the overall redundant system. All voted outputs for unfailed channels are identical and any voter output not agreeing therewith is identified as being associated with a failed channel.

FIG. 4 depicts the timing of such operation wherein the signals $SY'_{A2}$, $SY'_{B2}$, $SY'_{C2}$, and $SY'_{D2}$ are generated in the next clock pulse following the generation of the second synchronized channel (e.g. following the generation of $SY_B$ at $t_2$) The voted outputs $SY''_{A2}$, $SY''_{B2}$, $SY''_{C2}$ and $SY''_{D2}$ are then generated at the next clock pulse. At such stage, the remaining channels (e.g. $CH_C$ and $CH_D$) have not yet reached the point at which they have generated their synchronization signals which, in the example discussed, occur at $t_3$ and $t_4$, respectively. When each channel generates its synchronization signal, it also internally generates a "WAIT" signal ($WAIT_A$, $WAIT_B$, $WAIT_C$ and $WAIT_D$) so that the operation of the processor is halted until the wait signal is no longer asserted (at an "end wait" point).

In one embodiment, for example, the system can be arranged to cause each processor to be placed in a "wait" state for a fixed time period, i.e., a fixed number of clock cycles from the time at which the voted outputs indicate that at least two processors have generated synchronization signals, e.g. until the time $t_6$, as shown in FIG. 4. In the situation illustrated, by the time $t_6$ all the processors have reached the synchronization stage (e.g., $CH_C$ and $CH_D$ have generated synchronization signals at $t_3$ and $t_4$) and all processors are then ready to begin the execution of identical operating instructions at time $t_6$ and will, therefore, continue their operations in a tightly synchronized manner as desired.

Figure 4A:
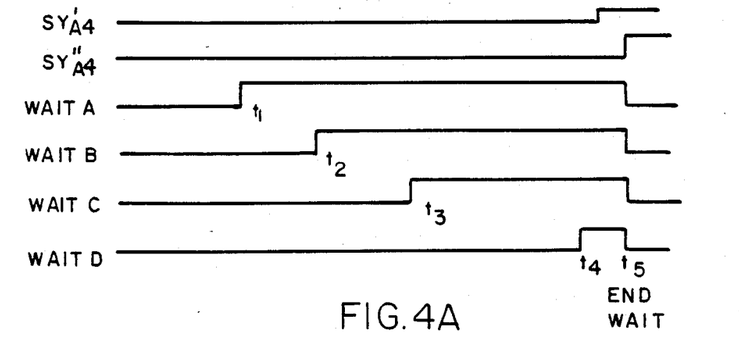

In an alternative embodiment shown in FIG. 4A, in order to avoid any unnecessary wait until the fixed number of clock cycles have occurred, the system can be arranged so that each of the counting circuits further asserts a signal representing a state in which all four processors have generated synchronization signals, in which case the counting circuits generate the signals $SY'_{A4}$, $SY'_{B4}$, $SY'_{C4}$ and $SY'_{D4}$ at one clock pulse following $t_4$ (only the signal $SY'_{A4}$ is representatively shown in FIG. 4). Such signals are supplied to voter circuits $V_{A4}$, $V_{B4}$, $V_{C4}$ and $V_{D4}$ to generate voted outputs $SY''_{A4}$, $SY''_{B4}$, $SY''_{C4}$ and $SY''_{D4}$ one clock pulse later (only $SY''_{A4}$ is representatively shown in FIG. 4). The generation of the latter signals indicates that all four processors are ready to begin operation and the "WAIT" signals in each channel are then placed in a non-asserted state, as shown at $t_5$. Thus the system if desired, avoids the necessity of further delaying its start for the waiting period from $t_5$ to $t_6$.

If any of the channel processors do not reach the synchronization stage at the end of the fixed time period, i.e., $t_6$, the system is arranged so that all processors which have reached the synchronized stage are permitted to begin execution of operating instructions. Any channel which is not ready at that time is treated as a failed channel. Accordingly, the fixed number of clock cycles is suitably selected to be sufficiently long so that all channels are given adequate time to reach the synchronization stage if they are operating in a normal, unfailed manner.

The counting circuitry and voter circuit, as mentioned above with reference to FIGS. 1 and 2 are conventional and will be well-known to those in the art and can be implemented in whatever manner is appropriate for the application in which the system is being used so that further descriptions of specific circuitry for such purposes are not necessary.

All of the embodiments discussed with reference to FIGS. 1-4, utilize the concept of generating a signal in one or more channels (e.g. data signals, interrupt signals, synchronization signals, etc.) and transmitting such signals from one channel to all the reamining channels and then distributing such signals, as received at the other channels, to voter circuitry in all of the channels so that the voted outputs therefrom are all identical representations of the original signal provided all channels are operating in the correct (i.e., unfailed) manner. Any voted output which does not agree with the identical signals from the unfailed channels is then identified as arising from a channel which has experienced a failure of some nature. Because the channels are all operating in a tightly synchronized manner, such signals can be transferred among the channels in a simple manner without the complex circuitry necessary when using asynchronous operation or some intermediate form of loosely synchronized operation.

The concept discussed with reference to the particular four redundant channel system depicted can be extended to any degree of redundancy required in a particular operation and the particular embodiments discussed are exemplary in nature only. Thus the approach of any of the embodiments discussed above may by applied to any number of redundant channels other than the specific four channel embodiments described. Modification thereof will occur to those in the art within the spirit and scope of the invention and, hence, the invention is not to be limited thereto except as defined by the appended claims.

What is claimed is:

1. An information handling system which includes a plurality of redundant information handling channels and at least one input signal supplied to one of said channels, said system comprising timing means for maintaining the operation of said channels in tight synchronism;

means in said one channel for transmitting said input signal received thereby to all other channels;

means in each said other channel for receiving the transmitted input signal from said one channel and for re-transmitting said received signals to all of said plurality of channels;

means in each of said channels for receiving said re-transmitted signals;

voting means in each of said channels responsive to the received re-transmitted signals from said other channels for providing a voted output signal in each channel; and means responsive to the voted output signals for determining the substantial identity of voted output signals from all unfailed channels, any channel not providing a voted output signal which corresponds to said substantially identical voted output signals being identifiable as a failed channel.

2. An information handling system in accordance with claim 1 wherein each of said channels is supplied with an input signal and further wherein each channel includes means for transmitting the input signal at each said channel to all other channels;

means for receiving the transmitted signals from all other channels and for re-transmitting said received signals to all channels; and voting means responsive to re-transmitted signals from all channels for providing a plurality of voted output signals in each channel.

3. An information handling system in accordance with claim 2 and further including means in each channel responsive to the plurality of voted output signals therein for providing a selected signal representative of the voted output signals; whereby the selected signals from all unfailed channels when said voted output signals are substantially identical, any channel not providing a selected signal which corresponds to said substantially identical selected signals being identifiable as a failed channel.

4. A system in accordance with claims 2 or 3 wherein said system includes a plurality of sensor means each associated with one of said channels for providing a plurality of signals representative of a sensed parameter value, which signals are respectively provided as input signals to each of said channels.

5. An information handling system in accordance with claim 1 wherein said system includes at least one sensor means for providing a signal representative of a sensed parameter value which sensed signal is provided as the input signal to said at least one channel.

6. An information handling system in accordance with claim 1 wherein said system includes an interrupt handling means associated with said one channel and responsive to a interrupt signal for providing said at least one input signal to said one channel.

7. An information handling system in accordance with claim 1 wherein each of said channels includes an interrupt handling means each responsive to an associated interrupt signal, an interrupt handling means of only one channel at a time providing an input signal to said one channel.

8. An information handling system in accordance with claims 7 or 8 wherein each of said channels further includes means for providing a masking signal to the voter means in each channel said voter means being responsive to and interpreting said masking signal so as to mask out from the voting operation a signal input thereto associated with a repetitive interrupt signal received at a channel.

9. A start-up operation control system for use in an information handling system which includes a plurality of redundant information handling channels having means for handling input information to provide output information, each of said channels capable of providing at different times channel synchronization signals;

timing means for maintaining the operation of said channels in tight synchronism;

means in each channel for transmitting said channel synchronization signals to all said channels;

means in each channel for receiving said transmitted channel synchronization signals;

counter means responsive to said received synchronization signals for providing a time cyclical counter output signal when synchronization signals from a selected number of said channels have been received;

means for transmitting said counter output signals to each of said channels;

voter means in each of said channels for receiving the transmitted counter output signals and for providing a voted output signal for each said channel;

means for preventing operation of any channel for a selected time period from the time which said voted output signal has been provided in each said channel; and means for permitting all channels which have produced a channel synchronization signal at the end of said selected time period to operate in tight synchronization and for preventing the operation of all channels which have not produced a channel synchronization signal at the end of said selected time period.

10. An information handling system in accordance with claim 9 wherein said operation preventing means includes means for permitting said selected time period to be selected as a fixed time period from the time at which said voted output signals have been provided in each said channel.

11. An information handling system in accordance with claim 9 wherein said operation preventing means includes means for permitting said selected time period to be selected to end substantially at the time the last one of said channels provides a synchronization signal.

12. An information handling system in accordance with claim 11 and further wherein said counter means in each said channel produces a further time cyclical counter output signal when all of the channels in said system produce a synchronization signal;

further voter means in each said channel responsive to the further counter output signals from the counter means in each said channel for providing further voted output signals; and means for permitting all said channels to begin operation when said further voted output signals have been provided.

13. An information handling system in accordance with claims 9, 10, 11 or 12 wherein said synchronization signals are produced by each of said channels at different times following start-up of the information handling system.

14. An information handling system in accordance with claims 9, 10, 11 or 12 wherein said system includes four redundant channels and said counter output signals are provided when synchronization signals have been received from at least two of said channels.

* * * * *